UNITED STATES PATENT OFFICE.

EDMUND F. BARNES, OF NEW YORK, ASSIGNOR TO STEPHEN D. LAW AND EDWARD P. CURTIS, OF BROOKLYN, N. Y.

IMPROVED PAINT COMPOSITION.

Specification forming part of Letters Patent No. 39,000, dated June 23, 1863.

*To all whom it may concern:*

Be it known that I, EDMUND F. BARNES, of the city and State of New York, have invented a new and improved article of manufacture or composition of matter for use as a paint, cement, &c.; and I do hereby declare that the following is a full, clear, and exact description thereof, and of its construction and mode or manner of operation.

In the production of paints, at least for all purposes and uses where it is necessary or desirable to have a paint of a white color, or a paint which is not dark, lead and zinc are the only substances which have thus far been used with any reasonable degree of success. Both these substances, however, are subject to the influences of the oxygen of the atmosphere, (or its adjuncts, as chlorine at the sea-side and sulphureted carbonic acid and sulphureted hydrogen in cities,) and consequently soon yield to their disintegrating action. The consequences are that the disintegrated paint falls off, or is held so slightly to the surface upon which it is spread that it easily rubs off or is removed by the ordinary action of the elements. Such effect is also soon produced, a few months being sufficient to so far disintegrate such paints that they begin to yield and fall off. The effect of the atmosphere, or of oxygen and its adjuncts, is also the same upon each of these substances, lead and zinc, though their appearances when so affected is very different. The reason of this is that when sulphureted hydrogen comes in contact with lead the sulphur unites with the lead and forms sulphuret of lead, which is dark colored, and this discolors the surface of the paints. When, however, sulphureted hydrogen comes in contact with zinc the sulphur, uniting with the zinc, forms sulphuret of zinc, which is white, and therefore makes no discoloration. In both cases, however, disintegration takes place. (Wells' Fam. Sci., 415.) The nature of both lead and zinc being therefore such that they are continually liable to disintegration by the action of the atmosphere, it is necessary for the obtaining of a more permanent article of paint to find some substance by which resistance to oxygenation shall be as complete as possible. It follows, consequently, that a purer carbonate than lead or zinc must be found and made use of, and that those substances, if used at all, should be used only in such quantities as to make or complete the chemical affinities between them and with the other substances made use of. Such a substance I have found in carbonate of lime when of a very pure quality, and when crystalline in character. Such carbonate of lime is found in nature in a pure or nearly pure condition in but very few instances, as the Iceland spar, which is almost entirely pure, the Carrara marble of Italy, and the Rutland marble of Vermont, which are nearly pure. The two first are very hard and difficult of reduction to a fine powder, while the latter is very easily reducible, comparatively speaking. I therefore prefer to make use of the purest Vermont marble. Marble also differs from the calcined carbonates of lime in having been subjected in the interior of the earth to heat and pressure, so that the carbonate of lime composing it has become crystalline, and having become crystalline it is not affected by atmosphere, as calcined carbonates are. The base of lime, as is well known, is also metallic, being the oxide of a metal called "calcium." Carbonate of lime, or powdered marble, thus furnishes both a crystalline and metallic base. It is also of such a purity that to a very considerable extent a complete chemical affinity can be established between it and a small proportion of the carbonates of lead and zinc through the presence or agency of oil, with which it may be mixed, the free acetic acid found in the oil combined with the neutral salts contained in it effecting a chemical union between the several carbonates of lime, lead, and zinc, and forming a combination which resists destructive influences in a manner no other paint has shown.

In the preparation of my improved paint, which, from its composition, may be aptly called a "compound chemical mineral paint," I use from eighty to eighty-six parts of carbonate of lime and from eight to ten parts each of carbonates of lead and zinc with a menstruum of linseed-oil of about a gallon, in measure, to the hundred pounds, or sufficient to mix, when ground, the several carbonates together. These unite in such a manner that the decaying influences of time seem to have little or no effect upon the composition. Surfaces which have been covered with it, and which have been continually exposed to the action of the atmospheric elements for a long time—more than eighteen months—continue firm and hard to the touch, like glass or polished marble, and show no signs of disintegration or decay and resist ordinary applications—such as potash— to remove it. The color of the composition is a purer white than that of zinc, but it readily receives or takes any color desired. It mixes readily with increased quantities of oil or any material for thinning it, and spreads as easily and smoothly as any other paint. From the experiments already made with it it shows by age an increased whiteness rather than any discoloration, and the longer it stands the harder it seems to become. It also furnishes a very firm and durable covering for iron, and adheres to it with a much greater tenacity than any of the ordinary kinds of paint.

In the selection of the marble for pulverizing care should be taken not to use any in which there are traces of iron and other metals, the presence of which may usually be determined by the veins of different colors in the stone, and the stone should then be reduced to fine powder by cracking, grinding, bolting, &c., but never by burning or calcining. The lead and zinc are then to be thoroughly mixed with the powdered marble and the whole then ground in oil in the usual manner, and it is considered preferable that this grinding should be performed in mills other than iron or metallic.

The proportions above named of the several substances entering into the composition of the paint may be varied somewhat, and such a variation may become necessary if the carbonates of lead and zinc used at one time are more pure than those used at another, without materially affecting the character or quality of the article; but from experiment it is believed that the proportions mentioned are such as are best adapted to effect the chemical union of the several parts. The theory or principle of the proper proportion of the several substances is that only sufficient lead and zinc are required to establish with the carbonate of lime, through the action or agency of the oil, the chemical affinity and union above mentioned, and if more of these substances are used than is necessary for such purpose the excess is only surplusage, without any particular advantage being derived therefrom. An increased quantity of oil is unnecessary for the same reason, and it is believed that most, or at least a great part, of the oil used to reduce the composition so that it can be spread (when oil is used for that purpose) is serviceable only as a means of thinning the paint so it can be easily spread.

My improved paint is also entirely free from poisonous qualities, and therefore does not subject those using or working in it to any of the dangers and diseases which attend on those working in lead.

This composition may also be used, and with great advantage, as a cement to fasten gas and other pipes, and for similar uses.

Linseed-oil or other vegetable oils having substantially the same chemical composition may be used for grinding the compound; but other oils, as kerosene, &c., may be used to reduce and thin the article so that it can be applied.

What is claimed as new, and is desired to be protected by Letters Patent, is—

The article of manufacture or composition of matter hereinbefore described, composed of crystalline carbonate of lime, carbonate of lead, carbonate of zinc, and oil, mixed or compounded according to the principle and substantially in the proportions specified.

E. F. BARNES.

Witnesses:
S. D. LAW,
A. C. FARNHAM.